United States Patent
Ohmura (10) Patent No.: US 10,759,306 B2
(45) Date of Patent: Sep. 1, 2020

(54) SEAT ADJUSTMENT DEVICE

(71) Applicant: TOYOTA JIDOSHA KABUSHIKI KAISHA, Toyota-shi (JP)

(72) Inventor: Yukito Ohmura, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 110 days.

(21) Appl. No.: 16/199,315

(22) Filed: Nov. 26, 2018

(65) Prior Publication Data
US 2019/0160974 A1    May 30, 2019

(30) Foreign Application Priority Data
Nov. 29, 2017  (JP) .................................. 2017-229403

(51) Int. Cl.
| | | |
|---|---|---|
| *B60N 2/04* | (2006.01) | |
| *B60N 2/02* | (2006.01) | |
| *B60N 2/06* | (2006.01) | |
| *B60N 2/00* | (2006.01) | |
| *B60N 2/01* | (2006.01) | |
| *B62D 25/20* | (2006.01) | |

(52) U.S. Cl.
CPC ........... *B60N 2/0252* (2013.01); *B60N 2/002* (2013.01); *B60N 2/01* (2013.01); *B60N 2/062* (2013.01); *B60N 2/065* (2013.01)

(58) Field of Classification Search
CPC ........ B60N 2/04; B60N 2/0252; B60N 2/002; B60N 2/01; B60N 2/062; B62D 25/20

USPC .......................................................... 701/49
See application file for complete search history.

(56) References Cited

U.S. PATENT DOCUMENTS

| | | | | |
|---|---|---|---|---|
| 6,775,603 | B2* | 8/2004 | Yester | B60R 16/037 |
| | | | | 235/375 |
| 2012/0086249 | A1* | 4/2012 | Hotary | B60N 2/976 |
| | | | | 297/284.3 |
| 2016/0075307 | A1* | 3/2016 | Jakobsson | B60R 25/209 |
| | | | | 701/2 |
| 2017/0028987 | A1 | 2/2017 | Yamada | |
| 2017/0072816 | A1* | 3/2017 | Lippman | B60N 2/0232 |

FOREIGN PATENT DOCUMENTS

| | | |
|---|---|---|
| JP | 2011-11613 | 1/2011 |
| JP | 2017-24653 | 2/2017 |

* cited by examiner

*Primary Examiner* — Tan Q Nguyen
(74) *Attorney, Agent, or Firm* — Oblon, McClelland, Maier & Neustadt, L.L.P.

(57) ABSTRACT

A seat adjustment device includes: an authentication unit that is configured to identify plural occupants of a vehicle; an acquisition unit that is configured to acquire information relating to each one of the plural vehicle occupants identified by the authentication unit; a determination unit that is configured to determine relationships between the plural vehicle occupants based on information acquired by the acquisition unit; and a control unit that is configured to control at least one of a position or an orientation of seats mounted in the vehicle based on determination results from the determination unit.

9 Claims, 7 Drawing Sheets

| USER ID 1 | USER ID 2 | RELATIONSHIP |
|---|---|---|
| UserA | UserB | COUPLE |
| UserA | UserD | UNRELATED PERSONS |
| UserC | UserA | PARENT/CHILD |
| ... | ... | ... |

FIG.4

| RELATIONSHIP | PITCH [cm] |
|---|---|
| PARENT/CHILD | XX1 |
| HUSBAND/WIFE | XX1 |
| COUPLE | XX1 |
| FRIENDS | XX2 |
| UNRELATED PERSONS | XX3 |
| ... | ... |

SEAT ADJUSTMENT DEVICE

CROSS-REFERENCE TO RELATED APPLICATION

This application is based on and claims priority under 35 USC 119 from Japanese Patent Application No. 2017-229403 filed on Nov. 29, 2017, the disclosure of which is incorporated by reference herein.

BACKGROUND

Technical Field

The present disclosure relates to a seat adjustment device.

Related Art

Technology that is provided in a rear portion of a vehicle, and adjusts the position of a seat that is mounted in the vehicle along rails that extend in a vehicle width direction is disclosed in Japanese Patent Application Laid-open (JP-A) No. 2001-11613.

However, in the technology disclosed in JP-A No. 2001-11613, because the position of the seat is adjusted manually by a vehicle occupant, in some cases it is not always possible for this position adjustment to be performed with ease.

SUMMARY

The present disclosure has been conceived in view of the above-described circumstances, and provides a seat adjustment device that enables seat positional relationships to be adjusted easily.

A first aspect of the present disclosure is a seat adjustment device including an authentication unit that is configured to identify plural occupants of a vehicle; an acquisition unit that is configured to acquire information relating to each one of the plural vehicle occupants identified by the authentication unit; a determination unit that is configured to determine relationships between the plural vehicle occupants based on information acquired by the acquisition unit; and a control unit that is configured to control at least one of a position or an orientation of seats mounted in the vehicle based on determination results from the determination unit.

According to the first aspect, at least one of the position or the orientation of seats mounted in a vehicle is controlled based on determination results of relationships between plural occupants of a vehicle. Accordingly, positional relationships between the seats may be adjusted easily.

In the above-described aspect, the acquisition unit may be configured to acquire information relating to each one of the plural vehicle occupants from a cloud server.

According to this structure, information relating to each one of the plural vehicle occupants is acquired from a cloud server. Therefore, information relating to the vehicle occupants may be acquired easily even if such information relating to the vehicle occupants has not been registered in advance.

In the above-described aspect, the determination unit may be configured to determine relationships between the plural vehicle occupants using learned models obtained by machine learning that uses information relating to each one of the plural vehicle occupants and relationships between the plural vehicle occupants.

According to this structure, the relationships between the plural vehicle occupants are determined using learned models obtained via machine learning. Therefore, the relationships between the vehicle occupants may be determined easily even if such relationships between the vehicle occupants have not been registered in advance.

The above-described aspect may further include a storage unit in which information relating to each one of the plural vehicle occupants is stored in advance, and the acquisition unit may be configured to acquire information relating to each one of the plural vehicle occupants from the storage unit.

According to this structure, information relating to vehicle occupants which has been registered in advance is acquired by the acquisition unit. Therefore, the information relating to the vehicle occupants may be acquired reliably.

The above-described aspect may further include a storage unit in which relationships between the plural vehicle occupants are stored in advance, and the determination unit may be configured to determine relationships between the plural vehicle occupants based on relationships between the plural vehicle occupants acquired from the storage unit.

According to this structure, the relationships between the vehicle occupants are determined by the determination unit based on relationships between vehicle occupants which have been registered in advance. Therefore, the relationships between the vehicle occupants may be determined accurately.

The above-described aspect may further include a storage unit in which seat arrangements that have been associated with the relationships between the plural vehicle occupants are stored, and the control unit may be configured to control at least one of the position or the orientation of the seats such that a seat arrangement that has been acquired from the storage unit based on the relationship between the plural vehicle occupants is employed.

According to this structure, at least one of the position or the orientation of the seats is controlled to employ a seat arrangement that has been registered and associated with the relationship between the vehicle occupants. Therefore, a seat positional relationship may be adjusted appropriately.

In the above-described aspect, the determination unit may be configured to determine, as the relationship between the plural vehicle occupants, a degree of familiarity between the plural vehicle occupants, and the control unit may be configured to perform at least one of control to move the seat positions closer together, or control to move the orientation of the seats closer to a mutually facing orientation as the degree of familiarity increases.

According to this structure, at least one of control to move the seat positions closer together, or control to move the orientation of the seats closer to a mutually facing orientation as the degree of familiarity between the plural vehicle occupants increases is performed. Therefore, a seat positional relationship may be adjusted appropriately.

As described above, according to the present disclosure, it is possible to adjust a seat positional relationship easily.

DETAILED DESCRIPTION

Hereinafter, exemplary embodiments for implementing the present disclosure will be described in detail with reference to the drawings.

First Embodiment

Figure 1:
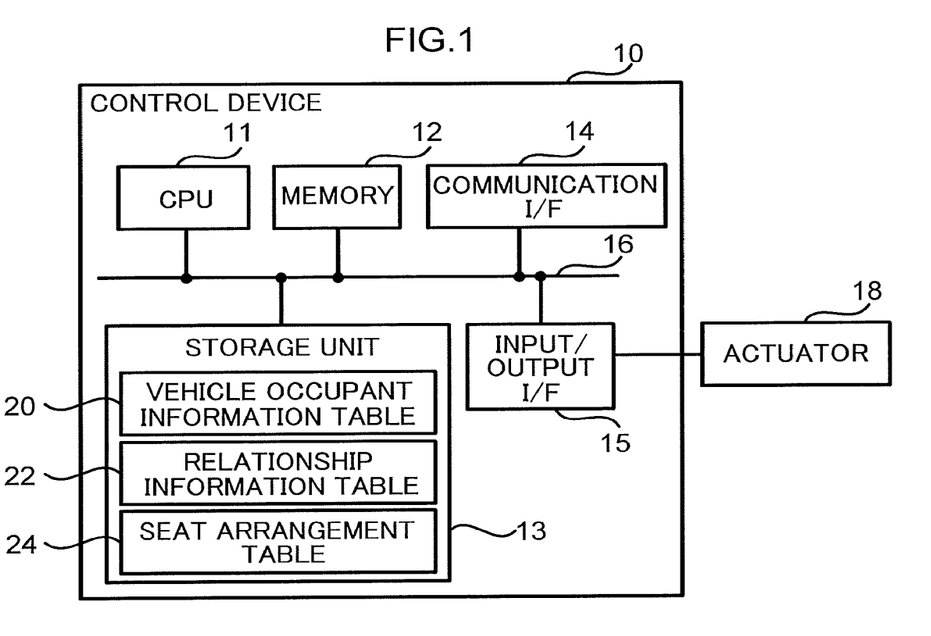
FIG. 1 is a block diagram illustrating an example of the structure of a control device according to a first exemplary embodiment.

Firstly, the structure of a control device 10 mounted in a vehicle according to the first exemplary embodiment will be described with reference to FIG. 1. As illustrated in FIG. 1, the control device 10 includes a central processing unit (CPU) 11, memory 12 that serves as a temporary storage area, and a non-volatile storage unit 13. In addition, the control device 10 includes a communication interface (I/F) 14 used for communication is performed with an external system, and an input/output I/F 15 to which an actuator 18 is connected. The CPU 11, the memory 12, the storage unit 13, the communication I/F 14, and the input/output I/F 15 are connected to a bus 16. An electronic control unit (ECU) is an example of the control device 10. Moreover, the control device 10 is an example of a seat adjustment device.

Figure 2:
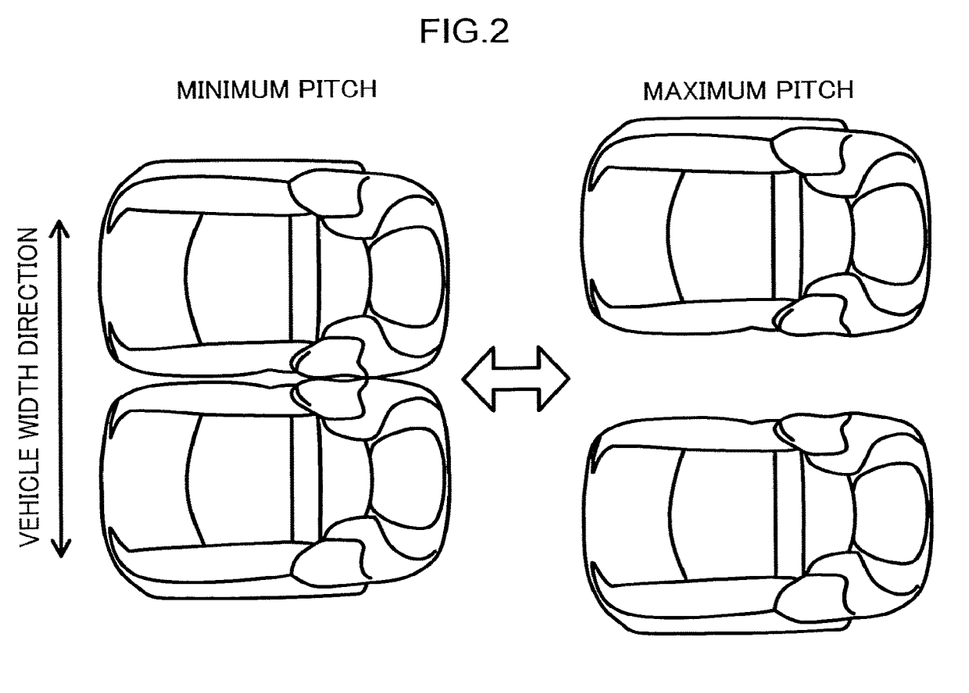
FIG. 2 is a plan view illustrating examples of seat positions in a state in which a minimum pitch is provided between seats mounted in a vehicle according to the respective exemplary embodiments, and in a state in which a maximum pitch is provided between these seats.

The CPU 11 controls the actuator 18 via the input/output I/F 15 to adjust the positions of rear seats of a vehicle in a vehicle width direction. The seats mounted in the vehicle according to the first exemplary embodiment are mutually independent of each other, and the pitch between the seats in the vehicle width direction is adjustable. For example, as illustrated in FIG. 2, the CPU 11 controls the actuator 18 to adjust the positions of the seats in the vehicle width direction between seat positions in which the pitch in the vehicle width direction between the rear seats of the vehicle is set to a minimum value, and seat positions in which this pitch in the vehicle width direction is set to a maximum value. Note that the seats adjusted by the control device 10 are not limited to the rear seats of a vehicle, and may be the front seats of a vehicle, or the middle row of seats in a vehicle having three rows of seats.

A vehicle occupant information table 20, a relationship information table 22, and a seat arrangement table 24 are stored in the storage unit 13. The vehicle occupant information table 20 stores information relating to vehicle occupants that has been registered in advance. In the first exemplary embodiment, the vehicle occupant information table 20 includes user identifiers (i.e., user IDs) that are used to identify vehicle occupants, and feature values extracted from images obtained by photographing the faces of vehicle occupants using a camera.

Figure 3:
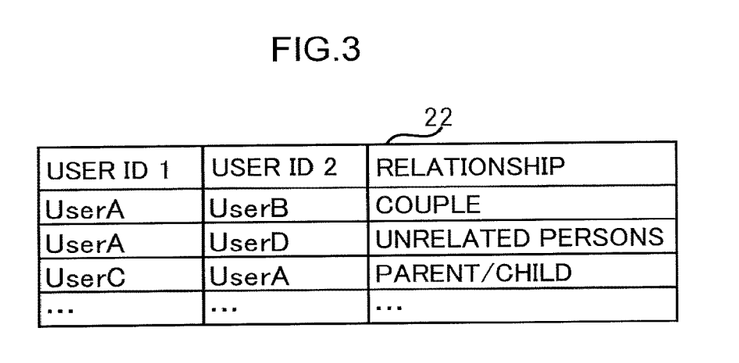
FIG. 3 is a view illustrating an example of a relationship information table according to the first exemplary embodiment and a third exemplary embodiment.

The relationship information table 22 stores information representing relationships between vehicle occupants that has been registered in advance. FIG. 3 illustrates an example of the relationship information table 22. As illustrated in FIG. 3, for every combination of two user IDs, the relationship between the vehicle occupants corresponding to the combination of user IDs is stored in the relationship information table 22 of the first exemplary embodiment.

Figure 4:
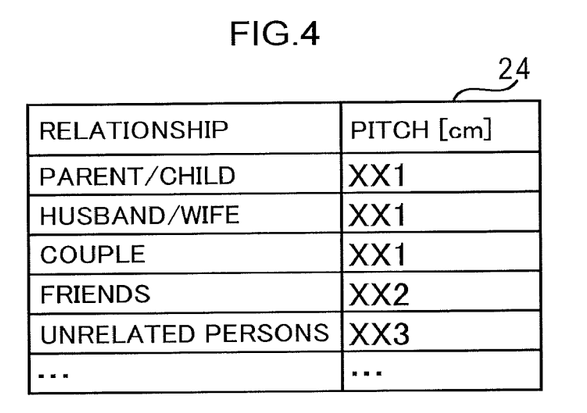
FIG. 4 is a view illustrating an example of a seat arrangement table according to the respective exemplary embodiments.

The seat arrangement table 24 contains information relating to seat arrangements for the seats subject to adjustment that has been registered in advance. FIG. 4 illustrates an example of the seat arrangement table 24. As illustrated in FIG. 4, pitches between the seats for each relationship between vehicle occupants are stored in the relationship information table 22 according to the first exemplary embodiment. In the first exemplary embodiment, the value of the pitch becomes smaller as the relationship between the vehicle occupants becomes more familiar. For example, if the relationship is [parent/child], [husband/wife], or [couple], the pitch is reduced to the minimum value, while if the relationship is [unrelated persons], the pitch is increased to the maximum value, and if the relationship is [friends], the pitch is set to an intermediate value between the minimum value and the maximum value. The relationship information table 22 may also store information indicating the positions in the vehicle width direction of each seat for each relationship between vehicle occupants.

Figure 5:
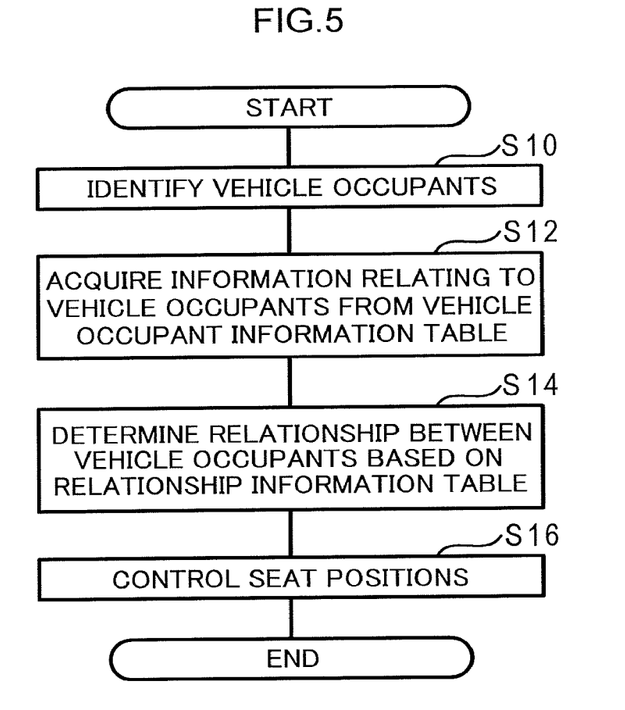
FIG. 5 is a flowchart illustrating an example of seat adjustment processing according to the first exemplary embodiment.

Next, an operation of the control device 10 according to the first exemplary embodiment will be described with reference to FIG. 5. FIG. 5 is a flowchart illustrating an example of the flow of seat adjustment processing executed by the CPU 11 of the control device 10 according to the first exemplary embodiment. In the first exemplary embodiment, the seat adjustment processing illustrated in FIG. 5 is executed by the CPU 11 running a program that has been stored in advance in the storage unit 13. As a result of the CPU 11 running the program stored in the storage unit 13, the CPU 11 functions as an authentication unit, an acquisition unit, a determination unit, and a control unit. The seat adjustment processing illustrated in FIG. 5 is executed, for example, when it is detected that a vehicle occupant has sat in a seat in the vehicle whose seat position is subject to adjustment, or when it is detected that the seatbelt of a seat in the vehicle whose seat position is subject to adjustment has been put on by a vehicle occupant.

In step S10 in FIG. 5, the CPU 11 identifies plural vehicle occupants (two vehicle occupants in the first exemplary embodiment). In the first exemplary embodiment, the CPU 11 performs control so as to photograph a vehicle occupant using a vehicle on-board camera provided at a position where it is able to photograph the face of a vehicle occupant who is seated in a seat, which is subject to seat position adjustment. The CPU 11 identifies the vehicle occupants by performing image analysis processing such as facial recognition processing on images obtained by this photography, and acquiring feature values for the faces of each vehicle occupant.

Alternatively, it is also possible for the CPU 11 to acquire audio (voice) of the vehicle occupants via an audio input device such as a microphone, and to identify the vehicle occupants using the acquired audio. Furthermore, if the vehicle occupants have been registered in advance, such as in the case of carpooling or the like, then the CPU 11 may identify the vehicle occupants by acquiring information registered in advance for those vehicle occupants via the communication I/F 14. Or, it is also possible for the CPU 11 to identify vehicle occupants by acquiring, via short-range wireless communication, identification information for mobile devices such as smartphones or the like held by the vehicle occupants.

In step S12, the CPU 11 acquires information relating to each vehicle occupant identified in step S10. In the first exemplary embodiment, the CPU 11 refers to the vehicle occupant information table 20, and acquires the respective IDs that correspond to each set of feature values acquired in step S10.

In step S14, based on the user IDs acquired in step S12, the CPU 11 determines a relationship between the vehicle occupants identified in step S10. In the first exemplary embodiment, the CPU 11 refers to the relationship information table 22, and determines the relationship between the vehicle occupants by acquiring the relationship that corresponds to the combination of the user IDs acquired in step S12.

In step S16, the CPU 11 controls the seat positions based on the determination result from step S14. In the first exemplary embodiment, the CPU 11 controls the seat positions by referring to the seat arrangement table 24, and controlling the actuator 18 such that the pitch between the seats is set to the pitch that corresponds to the relationship determined in step S14. After the processing of step S16 has been performed, the seat adjustment processing is ended.

As described above, according to the first exemplary embodiment, seat positions in the vehicle width direction are controlled based on relationships between vehicle occupants. Accordingly, seat positional relationships may be adjusted with ease.

Second Embodiment

The control device 10 mounted in a vehicle according to the second exemplary embodiment will now be described with reference to FIG. 6. Note that components that are the similar to those in the first exemplary embodiment are given the same descriptive symbols as in FIG. 1, and description thereof is omitted.

Figure 6:
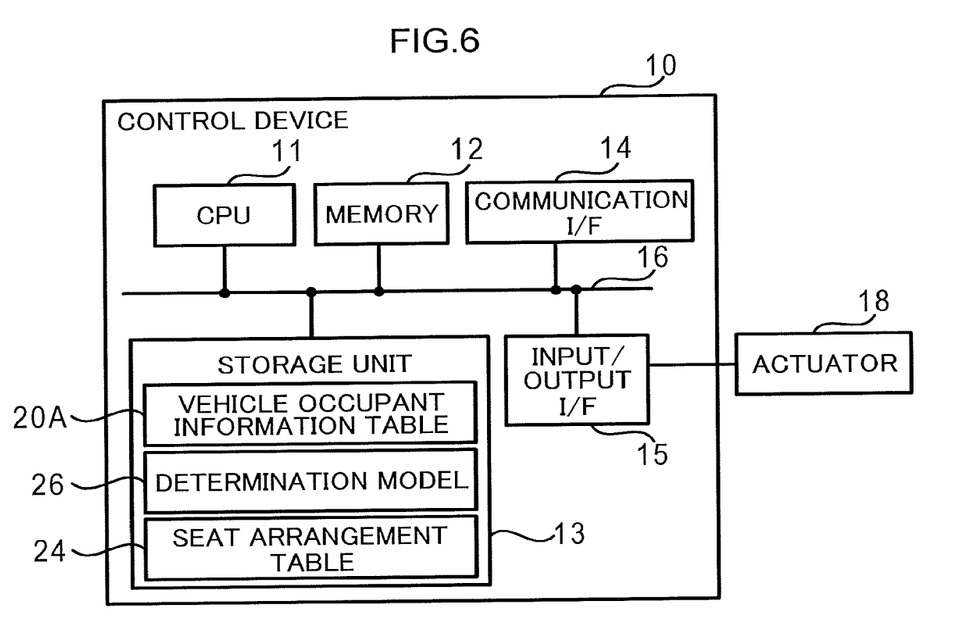
FIG. 6 is a block diagram illustrating an example of the structure of a control device according to a second exemplary embodiment.

As is illustrated in FIG. 6, a vehicle occupant information table 20A, the seat arrangement table 24, and a determination model 26 are stored in the storage unit 13 according to the second exemplary embodiment. In the second exemplary embodiment, the vehicle occupant information table 20A contains feature values extracted from images obtained by photographing the faces of vehicle occupants using a camera, and information that is used to acquire information relating to vehicle occupants such as Social Networking Service (SNS) account information, smartphone contract information and the like from a cloud server.

The determination model 26 is a model that is used when determining relationships between plural vehicle occupants. The determination model 26 according to the second exemplary embodiment is a model to which information relating to the respective vehicle occupants such as connections between the vehicle occupants on an SNS (for example, whether or not they are mutual followers of each other), and their evaluations of each other on an SNS (for example, the number of positive evaluations such as 'Likes'), and the like is input, and that outputs a relationship between the vehicle occupants. In addition, the determination model 26 according to the second exemplary embodiment is a learned model obtained by machine learning using training data that contains information relating to each vehicle occupant, and relationships between the vehicle occupants, which are prepared in advance.

Figure 7:
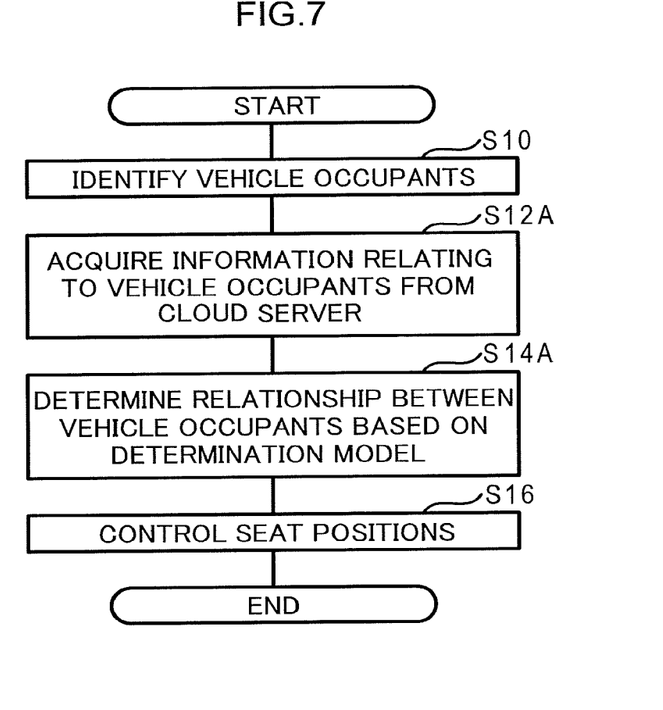
FIG. 7 is a flowchart illustrating an example of seat adjustment processing according to the second exemplary embodiment.

Next, an operation of the control device 10 according to the second exemplary embodiment will be described with reference to FIG. 7. FIG. 7 is a flowchart illustrating an example of the flow of seat adjustment processing executed by the CPU 11 of the control device 10 according to the second exemplary embodiment. Steps in FIG. 7, which are similar to those illustrated in FIG. 5, are given the same descriptive symbols as in FIG. 5, and description thereof is omitted.

In step S12A of FIG. 7, the CPU 11 acquires information relating to each vehicle occupant identified in step S10 In the second exemplary embodiment, the CPU 11 refers to the vehicle occupant information table 20, and acquires the information relating to each vehicle occupant via the communication interface I/F from a cloud server based on information corresponding to each set of feature values acquired in step S10. The CPU 11 may acquire SNS account information and the like for vehicle occupants about whom no information is contained in the vehicle occupant information table 20 via short-range wireless communication from smartphones or the like held by such vehicle occupants.

In step S14A, based on the information acquired in step S12A, the CPU 11 determines the relationship between the vehicle occupants identified in step S10. In the second exemplary embodiment, the CPU 11 refers to the relationship information table 22, and determines the relationship between the vehicle occupants by inputting the information acquired in step S12A into the determination model 26, and then acquiring the relationship between the vehicle occupants output from the determination model 26.

As is described above, according to the second exemplary embodiment, the effects similar to those obtained from the first exemplary embodiment may be realized.

Third Embodiment

The control device 10 mounted in a vehicle according to the third exemplary embodiment will now be described with reference to FIG. 8. Note that components that are the similar to those in the first exemplary embodiment and the second exemplary embodiment are given the same descriptive symbols as in FIG. 1 and FIG. 6, and description thereof is omitted.

Figure 8:
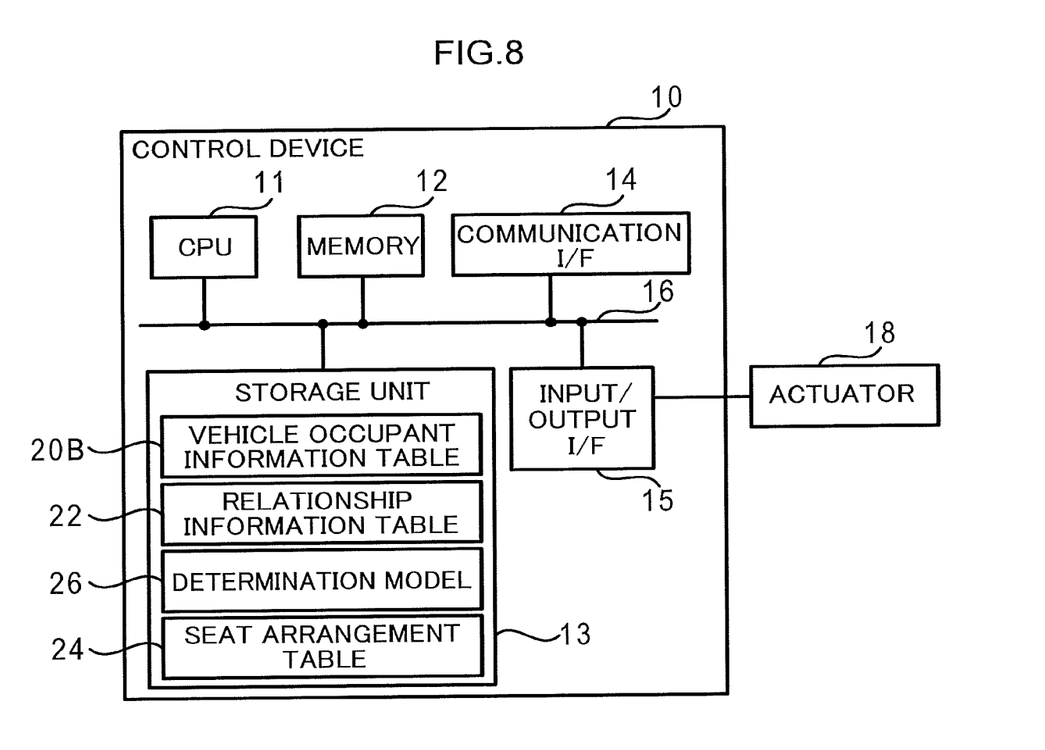
FIG. 8 is a block diagram illustrating an example of the structure of a control device according to a third exemplary embodiment.

As is illustrated in FIG. 8, a vehicle occupant information table 20B, the relationship information table 22, the seat arrangement table 24, and the determination model 26 are stored in the storage unit 13 according to the third exemplary embodiment. In the third exemplary embodiment, the vehicle occupant information table 20B contains feature values extracted from images obtained by photographing the faces of vehicle occupants using a camera, and information that is used to acquire information relating to vehicle occupants such as SNS account information, and smartphone contract information and the like from a cloud server. Additionally, in the third exemplary embodiment, user IDs that are used to identify vehicle occupants are also contained in the vehicle occupant information table 20B.

Figure 9:
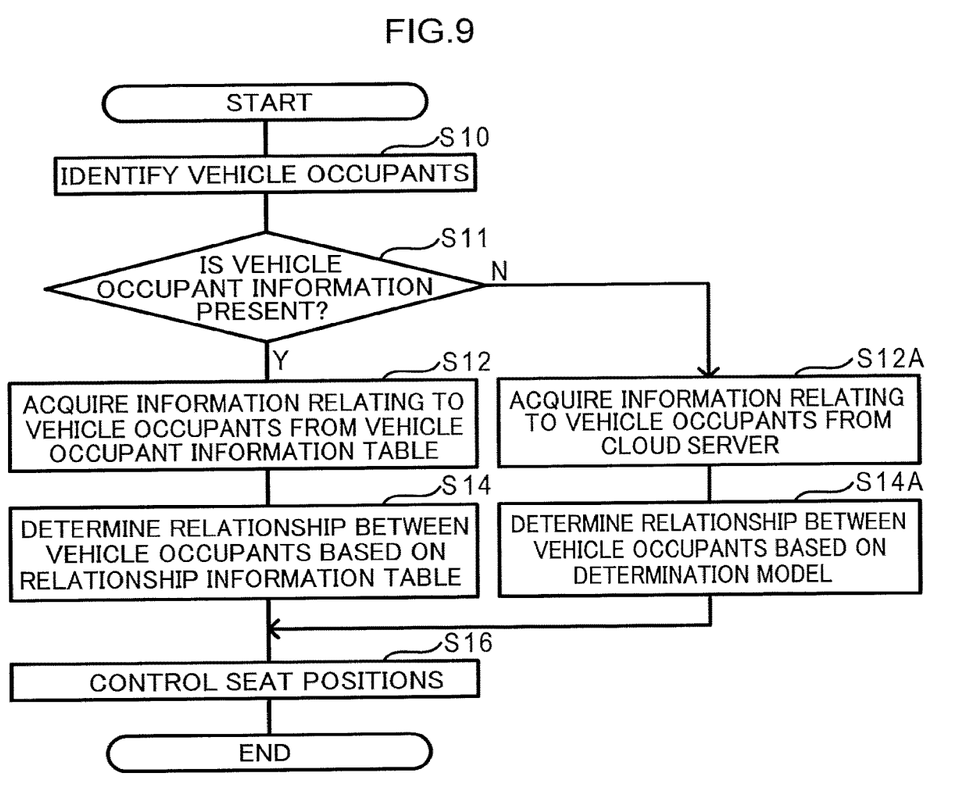
FIG. 9 is a flowchart illustrating an example of seat adjustment processing according to the third exemplary embodiment.

Next, an operation of the control device 10 according to the third exemplary embodiment will be described with reference to FIG. 9. FIG. 9 is a flowchart illustrating an example of the flow of seat adjustment processing executed by the CPU 11 of the control device 10 according to the third exemplary embodiment. Steps in FIG. 9, which are similar to those in FIG. 5 and FIG. 7, are given the same descriptive symbols as in FIG. 5 and FIG. 7, and description thereof is omitted.

In step S11 illustrated in FIG. 9, the CPU 11 determines whether or not user IDs that correspond to the feature values of the respective vehicle occupants acquired in step S10 are present in the vehicle occupant information table 20. If the result of this determination is affirmative, the processing moves to step S12, while if the result of this determination is negative, the processing moves to step S12A.

If the result of the determination in step S11 is affirmative, then the subsequent processing is the same as that performed in the first exemplary embodiment, while if the result of the determination in step S11 is negative, then the subsequent processing is the same as that performed in the second exemplary embodiment. Accordingly, further descriptions are omitted.

As described above, according to the third exemplary embodiment, the effects similar to those obtained from the first exemplary embodiment may be realized.

Note that, in each of the above-described exemplary embodiments, a case is described in which seat positions in the vehicle width direction are adjusted, however, the present disclosure is not limited to this. For example, the present disclosure may be applied to cases in which seat orientations (i.e., the angle of the seats relative to the vehicle width direction) are adjusted. In this case, for example, a mode in which the orientation of the seats is adjusted so as to become closer to a mutually facing orientation as the relationships between the vehicle occupants becomes more familiar may be employed. Additionally, it is also possible to employ a mode in which both the position in the vehicle width direction as well as the orientation of the seat are adjusted. Furthermore, if, for example, the relationship between the vehicle occupants is that of a [parent/child], and the child happens to be a young baby, then it is also possible for the seat occupied by the parent to be left facing towards the front, while the seat occupied by the child is rotated 90 degrees so as to face towards the parent.

Moreover, in the above-described embodiments, it is also possible to employ a mode in which, when the relationship between vehicle occupants is [unrelated persons], then the positions in the vehicle width direction of the seats are adjusted (for example, the pitch between the seats is adjusted to the maximum value), and a partition is erected between the seats.

Moreover, in the above-described embodiments, description is given of a case in which the positions in the vehicle width direction of seats that are mutually adjacent in the vehicle width direction are adjusted, however, the present disclosure is not limited to this. For example, it is also possible to employ a mode in which the positions in the vehicle front-rear direction of seats that are mutually aligned in the vehicle front-rear direction are adjusted.

Moreover, in the above-described exemplary embodiments, a case in which the relationships between vehicle occupants are expressed in words such as [parent/child] and [friend] is described, however, the present disclosure is not limited to this. For example, it is also possible to employ a mode in which relationships between vehicle occupants are expressed as numerical values representing a degree of familiarity or the like. In this case, a mode may be employed in which the seat positions are adjusted such that the pitch between the seats becomes narrower as the degree of familiarity increases.

Moreover, in the above-described exemplary embodiments, an audio input device such as a microphone may be provided inside the vehicle, conversations inside the vehicle between vehicle occupants may be acquired via the audio input device, and the relationship between the vehicle occupants may be determined from these acquired conversations.

Moreover, the processing performed by the CPU 11 in the above-described embodiments is described as being software processing that is performed as a result of a program being executed by the CPU 11, however, the processing may instead be processing performed by hardware. Alternatively, the processing performed by the CPU 11 may be processing that is performed via a combination of both software and hardware. The program stored in the storage unit 13 may also be stored on a variety of storage mediums and subsequently distributed.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A seat adjustment device comprising:
   an authentication unit that is configured to identify a plurality of occupants of a vehicle;
   an acquisition unit that is configured to acquire information relating to each one of the plurality of vehicle occupants identified by the authentication unit;
   a determination unit that is configured to determine relationships between the plurality of vehicle occupants based on information acquired by the acquisition unit; and
   a control unit that is configured to control at least one of a position or an orientation of seats mounted in the vehicle based on determination results from the determination unit.

2. The seat adjustment device according to claim 1, wherein the acquisition unit is configured to acquire information relating to each one of the plurality of vehicle occupants from a cloud server.

3. The seat adjustment device according to claim 1, wherein the determination unit is configured to determine relationships between the plurality of vehicle occupants using learned models obtained by machine learning that uses information relating to each one of the plurality of vehicle occupants and relationships between the plurality of vehicle occupants.

4. The seat adjustment device according to claim 1, further comprising a storage unit in which information relating to each one of the plurality of vehicle occupants is stored in advance,
   wherein the acquisition unit is configured to acquire information relating to each one of the plurality of vehicle occupants from the storage unit.

5. The seat adjustment device according to claim 1, further comprising
   a storage unit in which relationships between the plurality of vehicle occupants are stored in advance,
   wherein the determination unit is configured to determine relationships between the plurality of vehicle occupants based on relationships between the plurality of vehicle occupants acquired from the storage unit.

6. The seat adjustment device according to claim 1, further comprising a storage unit in which seat arrangements that have been associated with the relationships between the plurality of vehicle occupants are stored,
   wherein the control unit is configured to control at least one of the position or the orientation of the seats such that a seat arrangement that has been acquired from the storage unit based on the relationship between the plurality of vehicle occupants is employed.

7. The seat adjustment device according to claim 1, wherein the determination unit is configured to determine, as the relationship between the plurality of vehicle occupants, a degree of familiarity between the plurality of vehicle occupants, and
the control unit is configured to perform at least one of control to move the seat positions closer together, or control to move the orientation of the seats closer to a mutually facing orientation as the degree of familiarity increases.

8. A seat adjustment method comprising:
identifying a plurality of occupants of a vehicle;
acquiring information relating to each one of the identified plurality of vehicle occupants;
determining relationships between the plurality of vehicle occupants based on the acquired information; and
controlling at least one of a position or an orientation of seats mounted in the vehicle based on results of determination.

9. A non-transitory storage medium storing a program that causes a computer to execute a seat adjustment processing, the seat adjustment processing comprising:
identifying a plurality of occupants of a vehicle;
acquiring information relating to each one of the identified plurality of vehicle occupants;
determining relationships between the plurality of vehicle occupants based on the acquired information; and
controlling at least one of a position or an orientation of seats mounted in the vehicle based on results of determination.

* * * * *